United States Patent
Ulmasov et al.

(10) Patent No.: US 11,096,403 B1
(45) Date of Patent: Aug. 24, 2021

(54) LOW GLUCOSINOLATE PENNYCRESS MEAL AND METHODS OF MAKING

(71) Applicant: CoverCress Inc., St. Louis, MO (US)

(72) Inventors: Tim Ulmasov, Chesterfield, MO (US); Gary Hartnell, St. Peters, MO (US)

(73) Assignee: CoverCress Inc., St. Louis, MO (US)

( * ) Notice: Subject to any disclaimer, the term of this patent is extended or adjusted under 35 U.S.C. 154(b) by 448 days.

(21) Appl. No.: 15/927,910

(22) Filed: Mar. 21, 2018

Related U.S. Application Data

(60) Provisional application No. 62/474,076, filed on Mar. 21, 2017.

(51) Int. Cl.
| | |
|---|---|
| A23K 10/38 | (2016.01) |
| A23K 40/25 | (2016.01) |
| A23K 50/30 | (2016.01) |
| A23K 50/10 | (2016.01) |

(52) U.S. Cl.
CPC .............. *A23K 10/38* (2016.05); *A23K 40/25* (2016.05); *A23K 50/10* (2016.05); *A23K 50/30* (2016.05)

(58) Field of Classification Search
None
See application file for complete search history.

(56) References Cited

U.S. PATENT DOCUMENTS

| | | | |
|---|---|---|---|
| 2013/0101723 A1* | 4/2013 | Verkoeijen | A23D 9/00 |
| | | | 426/590 |
| 2015/0005172 A1 | 1/2015 | Robinson | |
| 2018/0042266 A1 | 2/2018 | Hetherington et al. | |
| 2019/0225977 A1 | 7/2019 | Ulmasov et al. | |

FOREIGN PATENT DOCUMENTS

| | | | |
|---|---|---|---|
| IN | 2043/MUM/2014 A | * 7/2014 | ............. A23L 1/211 |
| WO | 2017091891 A1 | 6/2017 | |

OTHER PUBLICATIONS

Sedbrook et al. "New Approaches to facilitate rapid domestication of a wild plant to an oilseed crop: Example pennycress". Available online as of 2014, Plant Science 227, 122-132. (Year: 2014).*

Shahidi ed. "Canola and Rapeseed". Springer Science and Business Media, LLC. 1990. pp. 1-355. (Year: 1990).*

Anderson International Corp—Andersen Durability, "Anderson International Corp 8" Expander-Extruder-Cooker TM", 2 page description of Integral Discharge Plate New Design.

Arisanu, "Mechanical Continuous Oil Expression From Oilseeds: Oil Yield and Press Capacity", 5th International Conference "Computation Mechanics and Virtual Enginerring", COMEC, 2013, pp. 347-352.

Biston et al., "Fast Analysis of Rapeseed Glucosinolates by Near Infrared Reflectance Spectroscopy", Journal of the American Oil Chemists' Society, 1988, vol. 65, No. 1599.

(Continued)

*Primary Examiner* — Jenna A Watts

(74) *Attorney, Agent, or Firm* — McKee, Voorhees & Sease, PLC

(57) ABSTRACT

Low glucosinolate seed meal from field pennycress seed and animal feed comprising the low glucosinolate seed meal are provided. Methods for processing field pennycress seed to obtain low glucosinolate seed meal and for identifying field pennycress seed with a low glucosinolate content are also provided.

8 Claims, 6 Drawing Sheets

(56) References Cited

OTHER PUBLICATIONS

Complete specification for IN0363DEL12 entitled Compositions and Methods for Production of Transgenic Plants having Reduced Glucosinolate Levels, Applicant National Institute of Plant Genome Research, dated Feb. 8, 2012, 56 pages.
Hassan et al., "Enzyme-Linked Immunosorbent Assays for Alkenyl Glucosinolates", Journal of Agricultural and Food Chemistry, 1988, pp. 398-403, vol. 36, No. 2.
Hogge et al., "HPLC Separation of Glucosinolates from Leaves and Seeds of Arabidopsis thaliana and Their Identification using Thermospray Liquid Chromatography/Mass Spectrometry", Journal of Chromatographic Science, 1988, pp. 551-556, vol. 26, No. 11.
Invitation to Pay Additional Fees for PCT/US2019/014178 dated Mar. 29, 2019.
Kliebenstein et al., "Gene Duplication in the Diversification of Secondary Metabolism: Tandem 2-Oxoglutarate-Dependent Dioxygenases Control Glucosinolate Biosynthesis in Arabidopsis", The Plant Cell, 2001, pp. 681-693, vol. 13, No. 3.
Kumar et al., "Brassica Oilseeds: Breeding and Management", CABI, 2015, 280 pages.
Kumar et al., "Lipid Extraction Methods from Microalgae: A Comprehensive Review", Frontiers in Energy Research, 2015.
Lichter et al., "Glucosinolates Determined by HPLC in the Seeds of Microspore Derived Homozygous Lines of Rapeseed (*Brassica napus* L.)", Plant Breeding, 1988, pp. 209-221, vol. 100, No. 3.
Prestlokken et al., "Expander Treatment", HFE 305 Feed Manufacturing Technology, 13 pages.
Tholen et al., "Measurement of the Glucosinolate Content in Rapeseed Using the Trubluglu Meter", Plant Breeding, 1993, pp. 137-143, vol. 110, No. 2.

\* cited by examiner

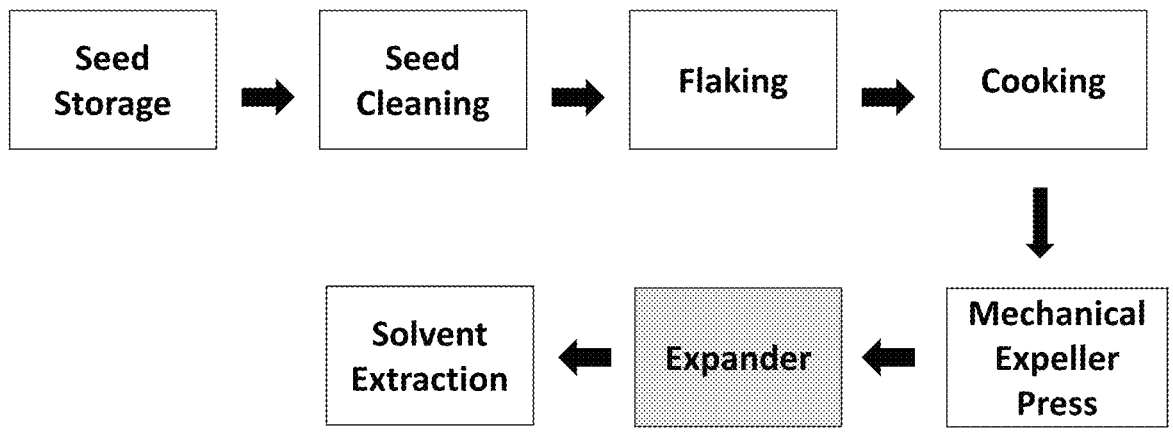
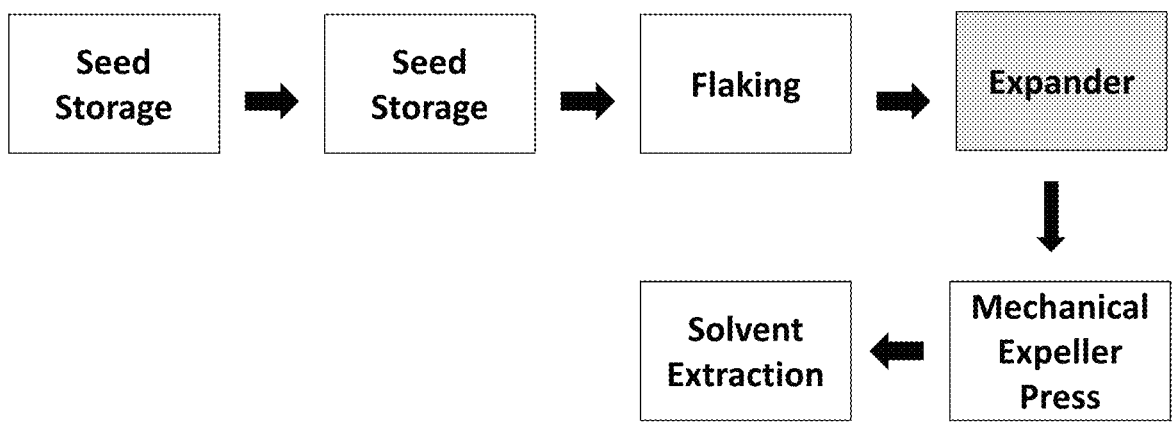
Figure 3A, B

C
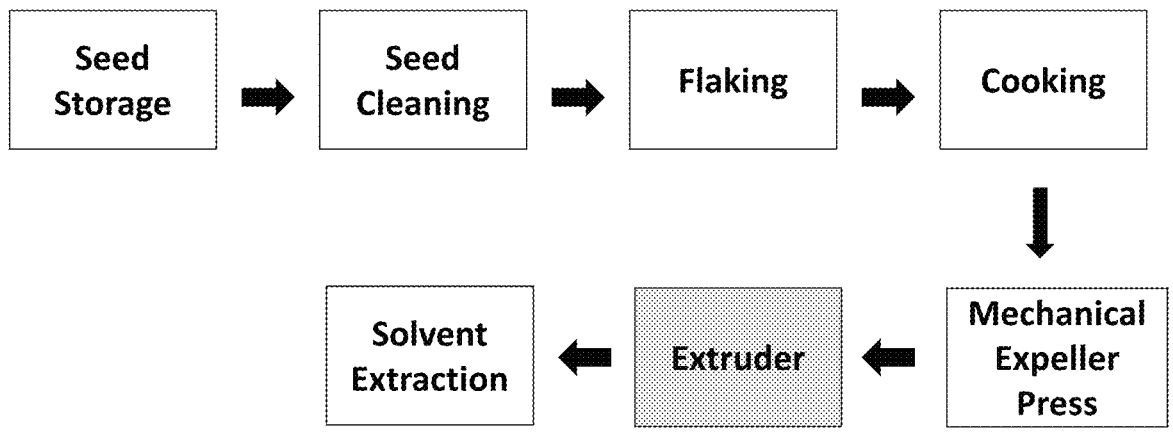
D
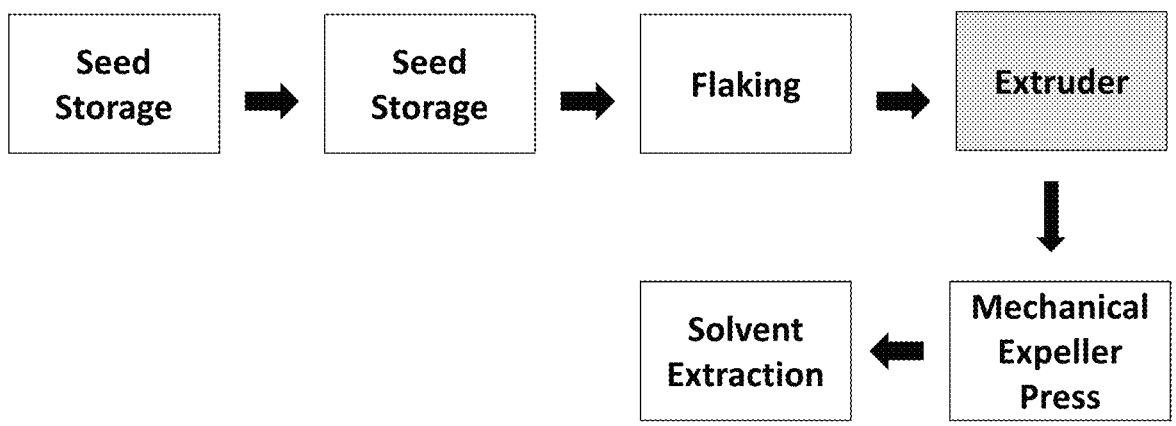
Figure 3C, D

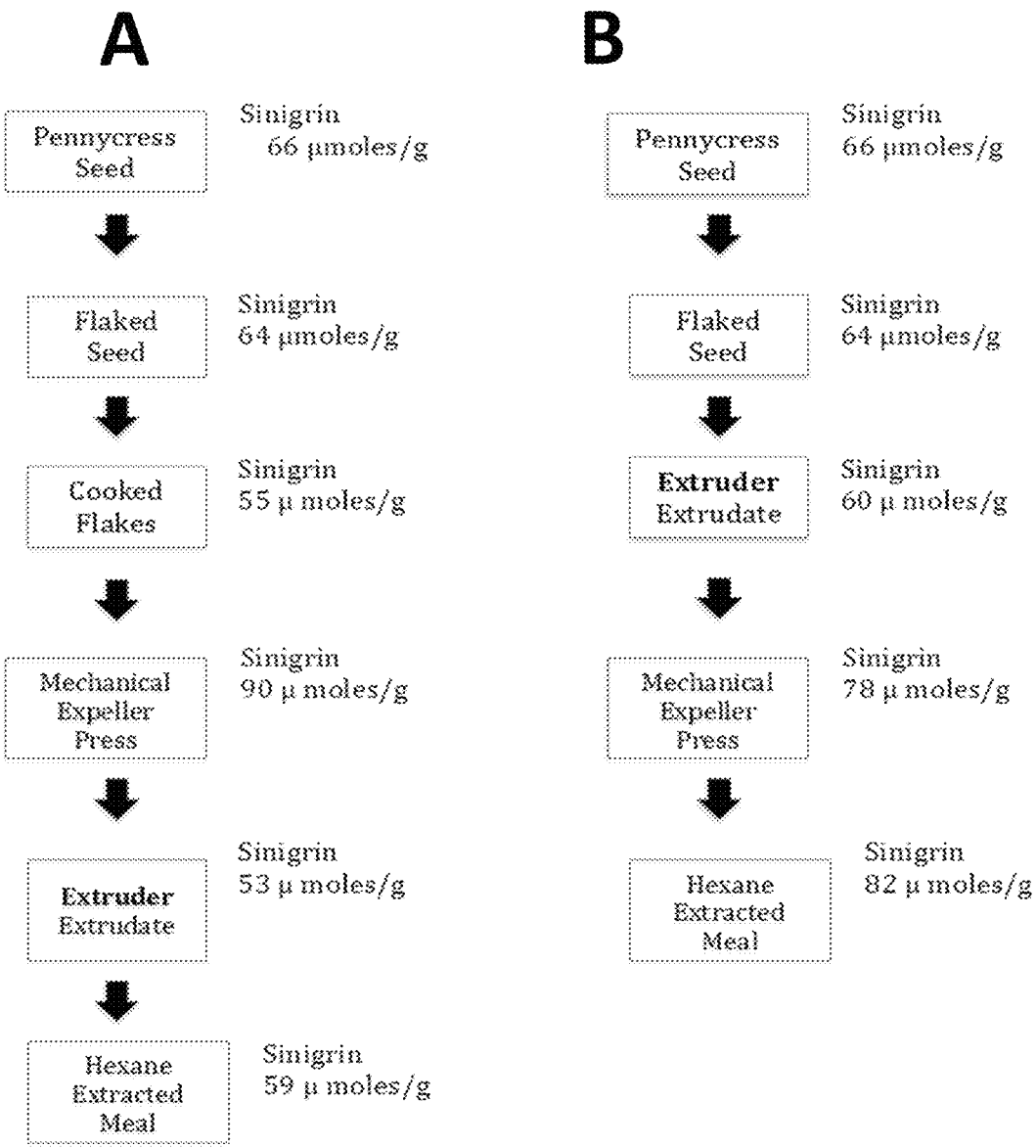
Figure 4A, B

LOW GLUCOSINOLATE PENNYCRESS MEAL AND METHODS OF MAKING

FIELD

This disclosure relates to low glucosinolate pennycress meal and methods of making it.

BACKGROUND

Different plants have seed content that make them desirable for feed compositions. Examples are soybean, sunflower, canola, rapeseed, camelina and mustard. After crushing the seeds and recovering the oil, the resulting meal has a protein content making the meal useful as a feed ingredient for ruminants and other animals. Nevertheless, there remains a desire for improved plant seeds that can provide additional sources of nutrition to animals.

Field Pennycress Thlaspi arvense L. (common names: fanweed, stinkweed, field pennycress) hereafter referred to as Field Pennycress or field pennycress is a winter cover crop that helps to protect soil from erosion, prevent the loss of nitrogen from water systems, and retain nutrients and residues to improve soil productivity. While it is well established that cover crops provide agronomic and ecological benefits to agriculture and environment, only 5% of farmers today are using them. One reason is economics—it requires on average ~$30-40/acre to grow a cover crop on the land that is otherwise idle between two seasons of cash crops such as corn and soy. In the last 5 years, it has been recognized that field pennycress could be used as a novel cover crop, because in addition to providing cover crop benefits, it is an oilseed with its oil being useful as a biofuel. Extensive testing indicates that it can be interseeded over standing corn in early fall and harvested in spring prior to soybean planting (in appropriate climates). As such, its growth and development requires minimal incremental inputs (e.g., no/minimum tillage, no/low nitrogen, insecticides or herbicides). Field Pennycress also does not directly compete with existing crops when intercropped for energy production, and the recovered oil and meal can provide an additional source of income for farmers.

Pennycress is a winter annual belonging to the Brassicaceae (mustard) family. The genome organization and gene structure is very close to Arabidopsis. It is also related to camelina, rapeseed and canola, which are also members of the Brassicaceae (mustard) family. Pennycress seeds are smaller than canola, but much bigger than Arabidopsis. They typically contain 36% oil, which is roughly twice the level found in soybean, and the oil also has a very low saturated fat content. Field Pennycress represents a clear opportunity for sustainable optimization of agricultural systems in the targeted Midwest geography, which consists primarily of ~35 M acres that remain idle after a corn crop is harvested and before the next soybean crop is planted. It can serve as an important winter cover crop working within the no/low-till corn and soybean rotation to guard against soil erosion and improve overall field soil nitrogen and pest management.

Field pennycress has an oil content that makes it highly desirable as a biofuel, and potentially as a food oil. Once the oil is obtained from field pennycress, through mechanical expeller pressing and hexane extraction, the resulting meal has a high protein level with a favorable amino acid profile that could provide nutritional benefits to animals. However, studies of field pennycress processing have consistently reported that the meal produced has a high level of an anti-nutrient glucosinolate called sinigrin. Extensive research has shown that glucosinolate concentrations in brassica-derived meals must be maintained below 30 µmoles/g DW (dried weight) meal; it is well established that modern processes used to produce meals, such as canola meal, heat the seeds during processing to temperatures during drying and cracking that denature the hydrolysis enzymes such as myrosinase. Although studies have shown that typical processing conditions also denature these hydrolysis enzymes, in field pennycress meal production the concentrations of sinigrin in seed remains too high to produce meal with concentrations below the 30 µmole/g DW level which is the maximum level currently allowed in animal feed. Therefore, the use of field pennycress seed to produce commercial meal for use as an animal feed ingredient has not been considered feasible. It would be desirable to consistently and reliably produce a field pennycress meal that has a low level of glucosinolates so the other nutritional benefits of field pennycress meal could be obtained. Further, it would be desirable to have a pennycress meal where the protein quality had not been degraded due to excessive heating and denaturing processes.

SUMMARY

In certain embodiments, a low glucosinolate pennycress meal composition is provided.

In certain embodiments, a method for producing low glucosinolate pennycress meal is provided. In certain embodiments, the method comprises subjecting pressed cake or flakes of pennycress seed to an expansion step, extrusion step, or extrusion/expansion step under heat, humidity and pressure, whereby the level of glucosinolate is reduced from the level prior to the expansion step, extrusion step, or extrusion/expansion step.

In yet another embodiment, is a method for identifying a preferred source for producing low glucosinolate pennycress meal by measuring sinigrin levels in a cost-effective and high throughput manner. The method comprises a combination of ion-exchange purification of desulfosinigrin followed by its direct quantitation using UV absorbance eliminating the need for HPLC.

Embodiments of the animal feed compositions, field pennycress seed meals, and related processes and methods provided herein also include:

Embodiment 1A. An animal feed composition comprising a protein component, wherein a portion of the protein component comprises pennycress meal having a glucosinolate level of less than 30 micromoles per gram of pennycress meal by dry weight.

Embodiment 2A. The animal feed composition of Embodiment 1A, wherein the pennycress meal has a glucosinolate content of less than 20 micromoles per gram of pennycress meal by dry weight.

Embodiment 3A. The animal feed composition of Embodiment 2A, wherein the pennycress meal has a glucosinolate content of less than 10 micromoles per gram of pennycress meal by dry weight.

Embodiment 4A. The animal feed composition of Embodiment 3, wherein the pennycress meal has a glucosinolate content of less than 10 micromoles per gram of pennycress meal by dry weight.

Embodiment 5A. The animal feed composition of Embodiment 1, wherein the pennycress meal comprises between 0.05% to 30% by weight of a diet or the composition.

Embodiment 6A. The animal feed composition of Embodiment 5, wherein the pennycress meal comprises between 0.1% and 10% by weight of a diet or the composition.

Embodiment 7A. A process for reducing the glucosinolate level in field pennycress seed, the process comprising subjecting the seed comprising glucosinolate and active enzymes, to an expansion step or extrusion step, under heat, humidity and pressure, whereby the level of glucosinolate is reduced from the level prior to the expansion step or extrusion step.

Embodiment 8A. A field pennycress seed meal comprising less than 30 micromoles per gram by dry weight of sinigrin made from a preferred source of seeds with low glucosinolates content.

Embodiment 9A. A method for identifying a preferred source for producing low glucosinolate pennycress meal by measuring sinigrin levels in a cost-effective and high throughput manner, wherein the method comprises a combination of ion-exchange purification of desulfosinigrin followed by its direct quantitation using UV absorbance eliminating the need for HPLC step.

Other embodiments of the sinigrin measuring methods provided herein include:

Embodiment 1B: A method for measuring sinigrin levels in a *Brassica* plant part comprising: (a) capturing sinigrin in a myrosinase-inactivating extract of the *Brassica* plant part in an anion-exchange chromatography (AEC) matrix; (b) treating the AEC matrix comprising the captured sinigrin with a sulfatase in an aqueous solution or water; (c) eluting the sulfatase in the aqueous solution from the AEC matrix to obtain an eluate comprising desulfosinigrin; (d) measuring desulfosinigrin in the eluate and determining sinigrin levels based on known amounts of a sinigrin reference standard, thereby measuring sinigrin levels in a *Brassica* plant part.

Embodiment 2B: The method of embodiment 1B, wherein the myrosinase-inactivating extract is obtained by extracting the plant part with methanol, other alcohols or a short treatment in boiling water.

Embodiment 3B: The method of any one of embodiments 1B or 2B, wherein the sulfatase comprises an enzyme capable of removing the sulfate group from sinigrin.

Embodiment 4B: The method of any one of embodiments 1B, 2B, or 3B, wherein the aqueous solution comprises a buffer which maintains pH of the aqueous solution near the pH optimum of the enzyme.

Embodiment 5B: The method of any one of embodiments 1B, 2B, 3B, or 4B, wherein the AEC matrix is a AEC column.

Embodiment 6B: The method of any one of embodiments 1B, 2B, 3B, 4B, or 5B, wherein the desulfosinigrin is measured by measuring absorbance of ultra-violet light at a wavelength of about 230 nanometers, by immunodetection or by measuring glucose.

Embodiment 7B: The method of any one of embodiments 1B, 2B, 3B, 4B, 5B, or 6B, wherein the *Brassica* plant part is a field pennycress plant part.

Embodiment 8B: The method of embodiment 7B, wherein the field pennycress plant part is a seed.

Embodiments of the field pennycress seed meals, animal feed compositions, and related processes and methods provided herein also include:

Embodiment 1C. A field pennycress seed meal comprising less than 30 micromoles per gram by dry weight of sinigrin.

Embodiment 2C. The field pennycress seed meal of embodiment 1C, wherein the meal comprises 5, 10, 15, or 20 to 25, 28, or 29.8 micromoles per gram by dry weight of sinigrin.

Embodiment 3C. The field pennycress seed meal of embodiment 1C or 2C, wherein the meal is solvent extracted.

Embodiment 4C. The field pennycress seed meal of any one of embodiments 1C to 3C, wherein the meal is obtained from field pennycress seeds having less than about 50 micromoles per gram by dry weight of sinigrin.

Embodiment 5C. The field pennycress seed of any one of embodiments 1C to 4C, wherein the field pennycress seeds are from field pennycress lines 1280 Macomb 2015, 1258 Macomb 2015, 1173 Win 2014, 1052 Macomb 2015, 1284 Macomb 2015, 1068 Win 2014, 2038 GFI 2016, 1177 Macomb 2015, 2072 GH 2016, 2551 Field 2016, 1038 Macomb 2015, 1014 Macomb 2015, or 1135 Macomb 2015.

Embodiment 6C. The field pennycress seed meal of any one of embodiments 1C to 5C, wherein the meal is obtained from field pennycress seeds having less than about 50 micromoles per gram by dry weight of sinigrin and processed with an expansion step or extrusion step for about 1 to 150 seconds, under conditions of elevated heat and pressure sufficient to obtain an expandate or extrudate wherein the sinigrin content is reduced by at least 6%, 10%, 20%, 30%, 40%, or 50% to 60%, 70%, 80%, or more in comparison to field pennycress seed meal obtained without the conditions elevated heat and pressure, or by the method of any one of embodiments 10C to 18C, 22C, or 23C.

Embodiment 7C. An animal feed composition comprising a protein component, wherein a portion of the protein component comprises the field pennycress seed meal of any one of embodiments 1C to 6C.

Embodiment 8C. The animal feed composition of embodiment 7C, wherein the pennycress seed meal comprises 0.05% to 30% by weight of the composition.

Embodiment 9C. The animal feed composition of embodiment 8C, wherein the pennycress seed meal comprises 0.1%, 0.5%, 1%, 2%, or 5% to 10%, 15%, or 20% by weight of the composition.

Embodiment 10C. A method of making a low glucosinolate field pennycress seed meal comprising:

(a) expanding and/or extruding for less than 10 minutes or with a retention time of 1 to 150 sec under high temperature and pressure a composition comprising: water and (i) the flaked pennycress seed, (ii) flaked and cooked pennycress seed, or (iii) pennycress seed cake, wherein the pennycress seed of (i), (ii), or (iii) is field pennycress seed having less than about 50 micromoles per gram by dry weight of sinigrin; to obtain an expandate or extrudate; and (b) processing the expandate or extrudate to obtain a meal, thereby obtaining a low glucosinolate field pennycress seed meal comprising less than 30 micromoles per gram by dry weight of sinigrin.

Embodiment 11C. A method of making a low glucosinolate field pennycress seed meal comprising:

(a) expanding or extruding a composition comprising: water and (i) the flaked pennycress seed, (ii) flaked and cooked pennycress seed, or (iii) pennycress seed cake, wherein the pennycress seed of (i), (ii), or (iii) is field pennycress seed having less than about 50 micromoles per gram by dry weight of sinigrin; under conditions of elevated heat and pressure sufficient to obtain an expandate or extrudate wherein the sinigrin content is reduced by at least 6%, 10%, 20%, 30%, 40%, 50%, or 60% to in comparison to the (i) the flaked pennycress seed, (ii) flaked and cooked pennycress seed, or (iii) pennycress seed cake; and (b) processing the expandate or extrudate to obtain a meal, thereby obtaining a low glucosinolate field pennycress seed meal comprising less than 30 micromoles per gram by dry weight of sinigrin.

Embodiment 12C. The method of embodiment 10C or 11C, wherein the method further comprises flaking field pennycress seeds having less than about 50 micromoles per gram by dry weight of sinigrin to obtain flaked pennycress seed to obtain the flacked pennycress seed used in any one of steps (a)(i), (a)(ii), or (a)(iii).

Embodiment 13C. The method of any one of any one of embodiments 10C to 12C, wherein the method further comprises cooking the flaked pennycress seed to obtain the flaked and cooked pennycress seed used in steps (a)(ii) or cooking and pressing the pennycress seed to obtain the pennycress seed cake of (a)(iii).

Embodiment 14C. The method of any one of embodiments 10C to 13C wherein expanding is performed in an expander at a temperature of about 90 to 100, 120, or 150 degrees centigrade, a final pressure before the expander outlet of about 10, 20, 30, or 40 to about 60, 80, or 100 bars, and/or a retention time of the composition in the expander of about 1, 2, or 3 to 10, 15, 20, 40, or 60 seconds; and wherein the percentage of water in the composition is about 10%, 15%, or 20% to 40%, 50%, 60%, or 80% by weight.

Embodiment 15C. The method of any one of embodiments 10C to 13C, wherein extruding is performed in an extruder at a temperature of about 80, 90, or 100 to about 120, 140, 160, or 200 degrees centigrade, a final pressure before the extruder outlet of about 25, 30, or 40 to about 60, 70, 80, 90, or 100 bar, and/or a retention time of the composition in the extruder of about 10, 20, or 40 to about 60, 120, or 150 seconds; and wherein the percentage of water in the composition is about 10%, 15%, or 20% to 40%, 50%, 60%, or 80% by weight.

Embodiment 16C. The method of any one of embodiments 10C to 15C, wherein the expandate or extrudate obtained from the flaked penny cress seed of step (a)(i) or the flaked and cooked pennycress seed of step (a)(ii) is processed in step (b) by at least one of the following steps comprising: (i) macerating or grinding the expandate or extrudate; (ii) expelling the expandate or extrudate to obtain pressed cake; and/or (iii) extracting the pressed cake with solvent.

Embodiment 17C. The method of any one of embodiments 10C to 16C, wherein the expandate or extrudate obtained from the pennycress seed cake of step (a)(iii) is processed in step (c) by at least one of the following steps comprising: (i) macerating and/or grinding the expandate or extrudate; and/or (ii) extracting the expandate or extrudate and/or macerated and/or ground expandate or extrudate with solvent, wherein the solvent is optionally any hexane, any combination of hexanes, or mixed hexanes; or any terpene (including d-limonene, p-cymene and a-pinene) or mixture thereof, or an ionic liquid.

Embodiment 18C. The method of any one of embodiments 10C to 17C, wherein the low glucosinolate field pennycress seed meal that is obtained comprises 5, 10, or 15 to 29.8 micromoles per gram by dry weight of sinigrin.

Embodiment 19C. A method of making an animal feed composition comprising a protein component wherein a portion of the protein component comprises low glucosinolate field pennycress seed meal, said method comprising combining a carbohydrate-containing composition with field pennycress seed meal comprising less than 30 micromoles per gram by dry weight of sinigrin.

Embodiment 20C. The method of embodiment 18C, wherein the carbohydrates are from corn, wheat, sorghum, barley, rye, and/or oats.

Embodiment 21C. The method of embodiment 18C or 19C, wherein another portion of the protein component comprise distillers grains, dried distiller grains with solubles, soybean meal, sunflower meal, canola meal, brewers grains, corn gluten feed, corn gluten meal, or any combination thereof.

Embodiment 22C. The method of any one embodiments 10C to 18C, wherein the conditions of elevated heat and pressure are sufficient to obtain an expandate or extrudate wherein: (a) the sinigrin content is reduced by at least 6%, 10%, 20%, 30%, 40%, or 50% to 60%, 70%, 80%, or more in comparison to the (i) the flaked pennycress seed, (ii) flaked and cooked pennycress seed, or (iii) pennycress seed cake; or (b) the sinigrin content is reduced by at least 6%, 10%, or 15% to 20%, 30%, 40%, 50%, 60%, 70%, or 80% in comparison to the (i) the flaked pennycress seed, (ii) flaked and cooked pennycress seed, or (iii) pennycress seed cake.

Embodiment 23C. The method of any one embodiments 10C to 18C or 22C, wherein an exogenous myrosinase is not added to: the (i) the flaked pennycress seed, (ii) flaked and cooked pennycress seed, or (iii) pennycress seed cake, any extrudate or expandate, and/or to any expellate, including seedcake.

Embodiment 24C. The field pennycress seed meal of embodiment 6C, wherein the expansion step or extrusion step is under conditions of elevated heat and pressure sufficient to obtain an expandate or extrudate wherein the sinigrin content is reduced by: (a) at least 6%, 10%, 20%, 30%, 40%, or 50% to 60%, 70%, 80%, or more in comparison to field pennycress seed meal obtained without the conditions elevated heat and pressure; or (b) at least 6%, 10%, or 15% to 20%, 30%, 40%, 50%, 60%, 70%, or 80% in comparison to field pennycress seed meal obtained without the conditions elevated heat and pressure.

BRIEF DESCRIPTION OF THE DRAWINGS

The accompanying drawings, which are incorporated in and form a part of the specification, illustrate the embodiments of the present disclosure and together with the description, serve to explain the principles of the disclosure. In the drawings:

FIG. 3A,B,C,D illustrates the incorporation of an expansion step (i.e., "expander") in seed processing FIG. 4A,B illustrates the effects of inserting the extruder in the pennycress seed processing on sinigrin content.

DETAILED DESCRIPTION

Figure 1:
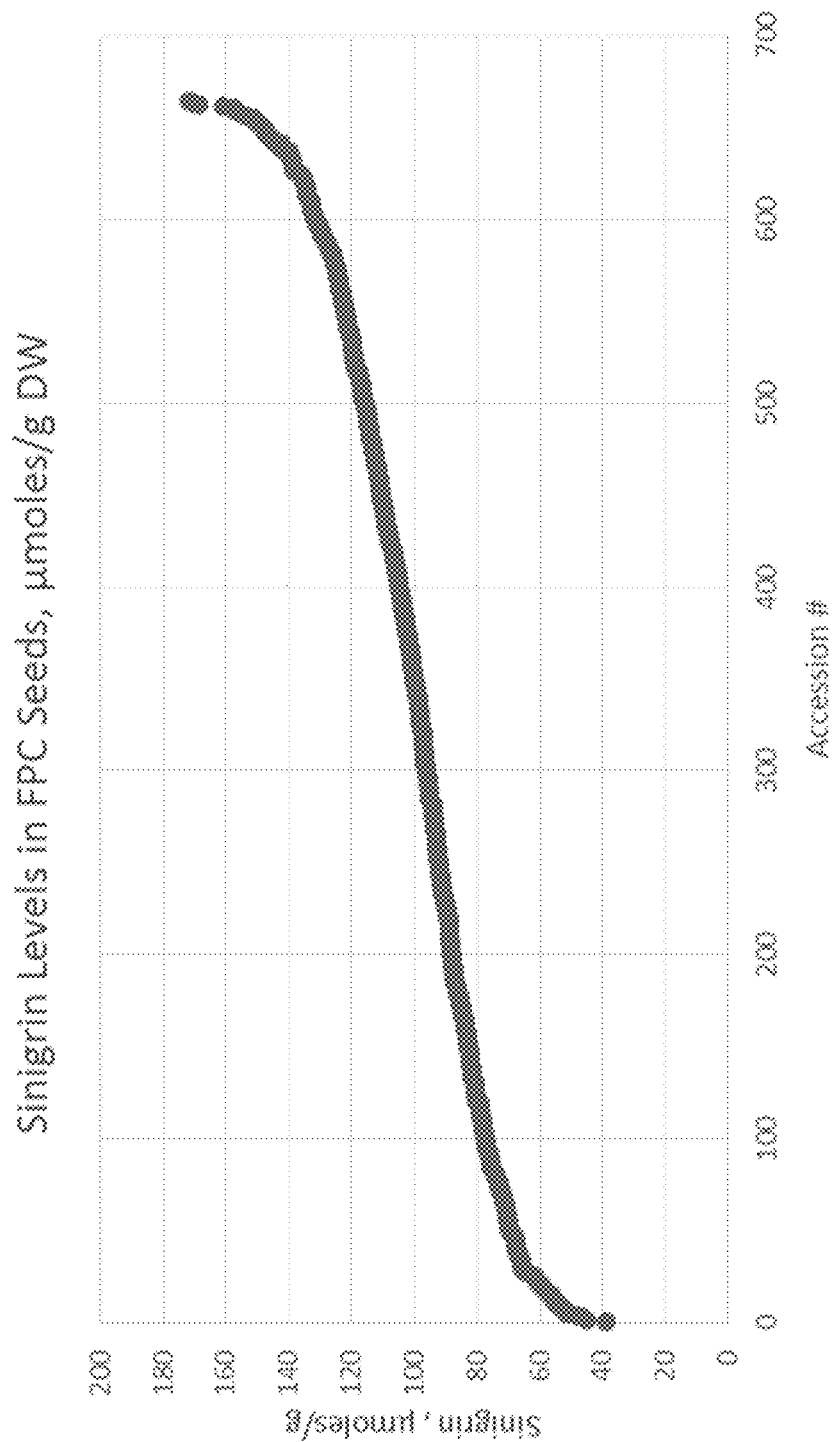
FIG. 1 illustrates the results of screening proprietary lines of field pennycress for sinigrin content using high throughput UV-absorbance-based method. X-axis represents line accession number; Y-axis represents sinigrin content in µmoles/g seed (dry weight). Each dot represents a single line. Sorted results of screening a seed library containing 669 wild-type accessions of Field Pennycress from the Arvegenix proprietary collection that were sourced from locations across the United States of America are shown in FIG. 1.

As used herein, the terms "include," "includes," and "including" are to be construed as at least having the features to which they refer while not excluding any additional unspecified features.

The term "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Field pennycress is considered a weed and grows wildly throughout the lower 48 contiguous states in the US included in the soybean and corn growing geography. Over 850 different seed lines have been collected from across the US. Typically, the level of glucosinolates in pennycress seed varies between 70 and 130 micromoles per gram by dry weight. Sinigrin is the sole glucosinolate found in field pennycress. During a typical oilseed processing procedure, extraction of the oil leads to an increase in the concentration of glucosinolates by 25-50% as a result of oil mass removal. To be useful as an animal feed, the level of glucosinolate should be less than 30 micromoles per gram by dry weight, preferably less than 20 micromoles per gram by dry weight, and more preferably less than 10 micromoles per gram by dry weight of meal.

Field pennycress meal is the product obtained from crushing cooking, expanding and oil extraction (mechanical expeller press and solvent extraction) of the seed. The meal is the material that remains after most of the oil has been removed. It should not contain less than 28% crude protein, a maximum of 30% crude fiber, and it may contain up to 15% residual oil. The meal of this disclosure contains less than 30 micromoles total glucosinolates/g meal dry weight, i.e., sinigrin (2-propenyl glucosinolate). It can be used in the diets of beef cattle at a concentration of up to 20% by weight of the feed composition, preferably up to 15%, and more preferably up to 10%. In pigs fed in confinement for slaughter and sows, broiler and egg laying chickens, the field pennycress meal can be employed at a concentration of up to 15%, and preferably up to 10% by weight of the feed composition.

In one method to prepare low glucosinolate pennycress meal of this disclosure, the glucosinolate level of selected pennycress seeds is measured using a novel high throughput UV-absorbance based method. Today, glucosinolates can be measured using a variety of methods (reviewed in "*Brassica* Oilseeds: Breeding and Management*", Arvind Kumar, Surinder S. Banga, Prabhu Dyal Meena, Priya Ranjan Kumar Editors, CABI, 2015). Many of these methods are based on the measurement of glucosinolate hydrolysis products. These include spectrophotometric/colorimetric analysis of reaction products formed between thymol-sulfuric acid and intact/desulfoglucosinolates, or determination of glucose liberated by myrosinase-catalyzed hydrolysis. The total glucosinolates can be also determined in seed samples by NIR (Biston et al., 1988) and light reflectance (Tholen et. al., 1993). However, more accurate methods are required to differentiate individual glucosinolates and/or varieties with low glucosinolate content (Kumar et al., 2015). In general, methods relying on measurement of glucose (such as 'Glukotest' or test-tape 'Diabetic kit') are found to be less sensitive and precise. Hassan et al. (1988) reported an enzyme-linked immune absorbent assay (ELISA) for determination of alkenyl glucosinolates, however, it was not specific for quantitative determination of sinigrin. The chromatographic techniques can overcome the limitations of the above-mentioned and other methods reviewed in Kumar et. al (2015). These methods include gas liquid chromatography (GLC) and high performance liquid chromatography (HPLC). While GLC methods pioneered accurate determination of individual glucosinolates content, the requirement for a heat treatment and derivatization made them less convenient and accurate than HPLC-based methods. Most of the major known glucosinolates can be resolved and quantified in a single chromatogram by the reverse phase HPLC or intact glucosinolates or desulfoglucosinolates. However, higher column temperature and expensive ion-pairing reagents are required for intact glucosinolates separation (Lichter et. al, 1988). To overcome this, a combination of column-exchange chromatography and HPLC method has been developed that is scalable to 96-well format (Kliebenstein et al., 2001). In brief, glucosinolates are extracted in 80% methanol that keeps the myrosinase inactive and loaded on DEAE Sephadex A-25 mini-column followed by washing and incubation with sulfatase to release desulfoglucosinolates. The individual desulfoglucosinolates are then separated on a reverse phase HPLC column and quantified by the peak area integration of their specific response factors. While accurate and reliable, this method is expensive and time-consuming as it requires HPLC analysis of each sample to obtain an individual peak area for each desulfoglucosinolate. Using this method for a high throughput screening of a large library of samples is largely prohibitive due to time and cost issues.

As Field Pennycress contains only one glucosinolate—sinigrin, the method developed by Kliebenstein et al. (2001) was modified by eliminating the time-consuming and expensive HPLC step. The modified method uses a similar protocol to generate desulfoglucosinolate, but instead of measuring the peak area on HPLC profile, the UV-absorbance of desulfosinigrin at 230 nm is measured. After adjustment for absorbance of the sulfatase enzyme also present in the eluate, the resulting $OD_{230}$ numbers for each sample can be normalized to a known amount of sinigrin standard present on the plate to generate an accurate sinigrin content estimate. The advantage of this method is that it is capable of producing sinigrin measurements for a large number of samples in a relatively short time. One embodiment of the modified method enabling fast and accurate determination of sinigrin in biological samples is disclosed in Example 1. The high throughput glucosinolate measurement system described herein can become a standard evaluation in breeding parents, progenies and final lines, making the low glucosinolate seed content and final meal content predictably low and consistent.

Low glucosinolate varieties, based on seed glucosinolate concentration, were identified using this method. After identification, seeds from the low glucosinolate varieties are subject to a flaking step. The flakes are then subjected to a glucosinolate reduction step, involving expansion under heat, humidity and pressure. The flakes have a glucosinolate level reduced from the level in the cake or flakes prior to the reduction step. The reduction step can be done using an expander which passes the flakes using an auger to a heated area (about 230° F.), high humidity and pressure. The material is forced via the pressure through an outlet nozzle and collected. The expander can be employed after the flakes or cake is formed, after subjecting the flakes or cake to a cooking step, or after the flakes or cake have been pressed through a mechanical expeller. The best results have been found when the expander is used after the mechanical expeller step (e.g., as in FIG. 3A).

Figure 2:
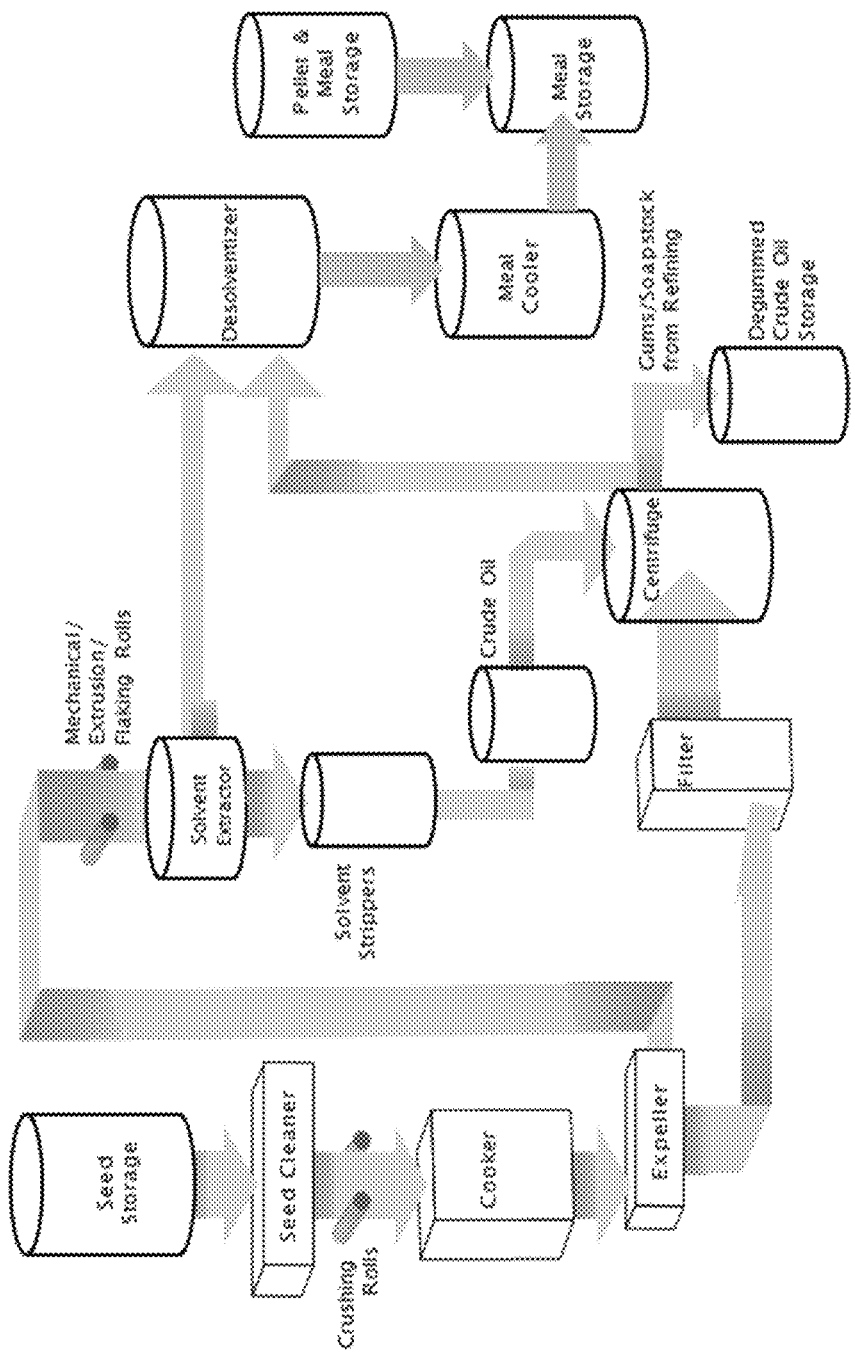
FIG. 2 illustrates a generic diagram of typical processing steps involved in plant oil production. Adapted from Feed Industry Guide, 5$^{th}$ Edition, 2015—Canola Meal Feeding Guide, Canola Council of Canada on the world wide web internet site canolacouncil.org/media/516716/2015_canola_meal_feed_industry_guide.pdf.

Normal processing of Brassicas such as canola to extract the oil is depicted in FIG. 2. Glucosinolates are undesirable in animal feed and therefore restricted based on the glucosinolate levels. The normal process for processing canola (FIG. 2) does not affect the glucosinolate levels of canola.

Adding a glucosinolate reduction step in the process can produce field pennycress meal with a glucosinolate level low enough to be useful as in animal feed depending on the glucosinolate concentration in the seed. The reduction step using an expander is also useful in achieving higher recovery of oil from the seed.

An unexpected finding of this disclosure is that the inclusion of an expander or extruder in the processing of Brassicas such as field pennycress results in a significant decrease in glucosinolates. The expander or extruder can be added either after the mechanical expeller press stage or in place of the cooker (FIG. 3 panels A and B for the expander, or FIGS. 3 C and D for the extruder, respectively). In yet another alternative, the expander or extruder can be added after the cooking step.

Using an expander or extruder in the process denoted in FIG. 3A or 3C, respectively sinigrin levels in mechanical expeller pressed field pennycress cake can be decreased by up to three times from the level measured after exiting the mechanical expeller.

Figure 5:
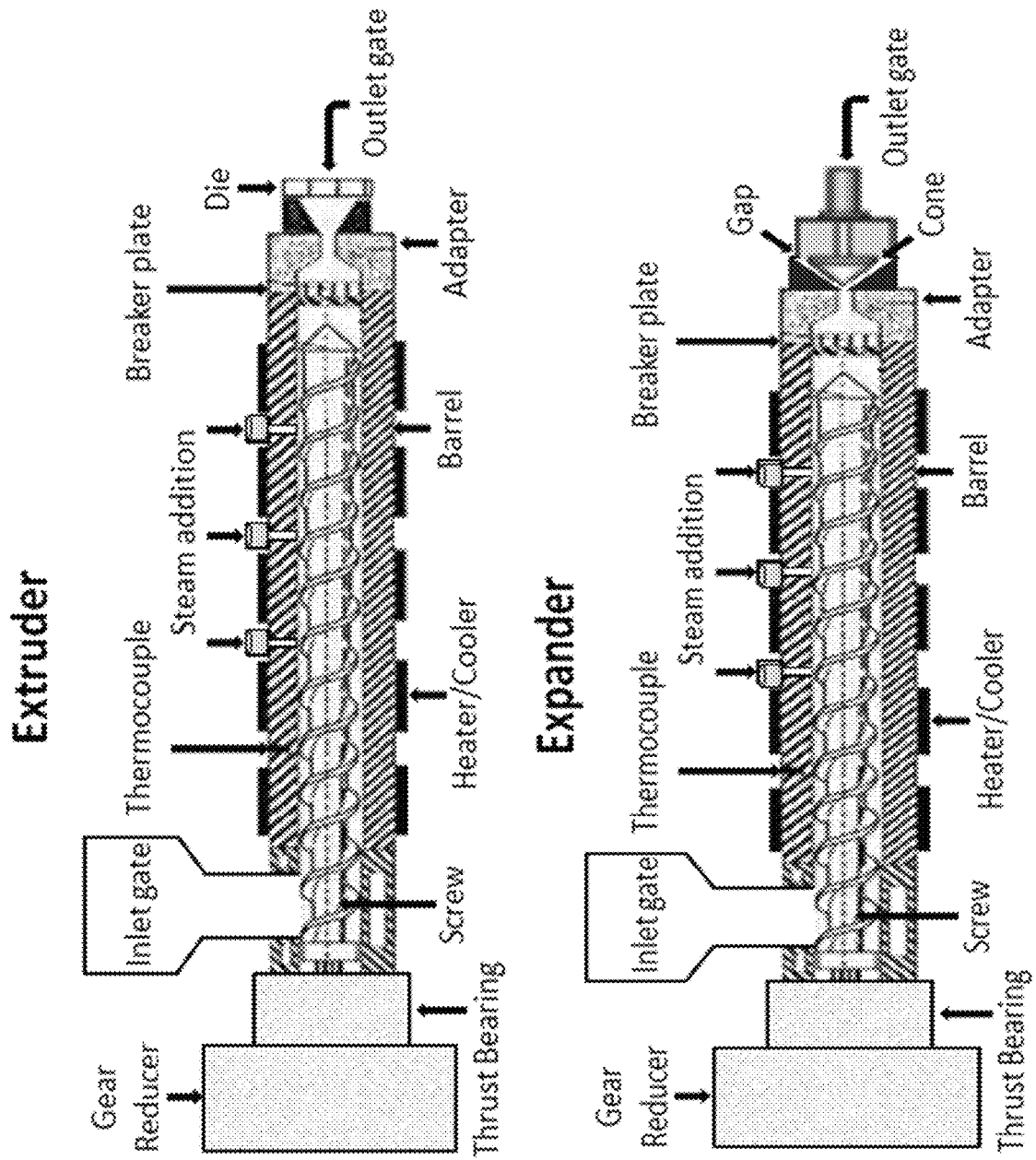
FIG. 5 illustrates an expander and an extruder.

Expanders that can be used in the methods provided herein are characterized by having an inlet opening for introduction of material to be expanded, a screw or auger that pushes the material through the barrel, a barrel having ports for steam entry distributed across its length, thermocouples, a combination of thermocouples and ports for stem entry, or neither, and a restricted outlet or gap through which the expandate passes. A schematic diagram of an expander is provided in FIG. 5. Such expanders typically permit passage of material through the barrel with a retention time of less than about 10 seconds. Pressure immediately decreases to atmospheric as soon as the material in the expander passes the resistor in the outlet, resulting in immediate evaporation of water and an immediate drop in temperature upon release of the expandate from the outlet. Commercial expanders that can be used in the methods provided herein include an Anderson oilseed expander (Anderson International, Stow, Ohio, USA), Andritz Expander (Andritz, Graz, Austria), Kahl expander (Amandus Kahl USA, Atlanta, Ga.), a Boa Compactor (Pelleting Technology Netherlands (PTN), Schijndel, Netherlands), Almex Contivar (Zutphen, Netherlands), Matador Food Processor, and the like.

Extruders that can be used in the processes provided herein are characterized by having an inlet opening for introduction of material to be extruded, a screw or auger that pushes the material through the barrel, a barrel having ports for steam entry distributed across its length or a thermocouple, and a die through which the extrudate passes. A schematic diagram of an extruder is provided in FIG. 5. Such extruders typically permit passage of material through the barrel with a retention time of more than 10, 20, or 40 seconds. In certain embodiments, temperatures of about 80 to about 200 degrees centigrade are provided in the extruder.

In certain embodiments, pressures of about 25 to about 100 bar are provided in the extruder or before the extruder outlet. Commercial extruders that can be used in the methods provided herein include an Andritz extruder (Andritz, Graz, Austria), a Kahl extruder (Amandus Kahl USA, Atlanta, Ga.), and similar devices. As defined herein, an extruder would also include an Anderson Expander-Extruder-Cooker™ (Anderson International, Stow, Ohio) or similarly configured device which has a die at its outlet through which extrudate passes. Anderson Expander-Extruder-Cooker™ or similarly configured device) can be used as an "extruder" in the process set forth in FIG. 3C or 3D to obtain pennycress seed meal having less than 30 micromoles sinigrin per gram dry weight. An expeller press is used in certain embodiments of the methods provided herein including those set forth in FIGS. 3A-D. Expeller press devices that can be used include a mechanical screw-type press that uses friction and pressure to squeeze the oil out of the seeds or other material. In certain embodiments, an expeller presses oil seeds through a caged barrel-like cavity where oil is pushed through openings that retain seed fiber solids. Afterward, the pressed seeds are formed into a hardened cake (e.g. "press cake"), which is removed from the machine. Expeller pressing occurs under heat in the range of 60-99° C.

Solvent extractions are performed in certain embodiments of the method provided herein. In certain embodiments, the solvents are petroleum ether or any hexane, any combination of hexanes, or mixed hexanes. In certain embodiments, the solvents comprise one or more terpenes. Such terpenes include d-limonene, p-cymene, a-pinene and combinations thereof. In certain embodiments, the solvent is an ionic liquid (e.g. non-aqueous salt solution that comprise both anions and cations which can be maintained in a liquid state at moderate temperatures (0-140 C)) (Kumar, R R et al., 2015).

In certain embodiments, pennycress seed with sinigrin levels lower than 50 micromoles/gram (e.g., as measured by the method described above or by any other technique), are then subjected to the oil extraction process following the steps shown in FIG. 3A(a) (i.e., mechanical expelling, followed by the expander, and then hexane extraction) or any of the other processes described herein or shown in FIG. 3B, 3C, or 3D to produce meals having sinigrin levels below 30 micromoles/gram. Such meals can be used as a feed ingredient in the diets of cattle, pigs, broiler and egg-laying chickens. Typically, the amount of field pennycress meal (FPM) is included at levels up to 30% in the diets of cattle, and 15% in the pigs, and broiler and egg-laying chickens.

Analysis of the nutritional value of field pennycress meal as an animal feed has shown that mechanically expeller pressed and hexane extracted meal contained 32-35% DW crude protein, 10.3 and 3.7% or less crude fat (respectively), and 29-33% DW crude fiber. Results additionally proved that erucic acid (3.3% DW), linoleic acid, linolenic acid and oleic acid are the predominant fatty acids. Amino acid analysis showed an adequate balance of essential amino acids, with moderate levels of the amino acids cystine and methionine, which both contain sulfur. Total sulfur levels were in the 0.6-1.1 range (% DW), with sinapine undetectable.

Typical animal feed compositions contain components such as carbohydrates, protein (amino acids), fat, vitamins and minerals. In the animal feed compositions of this disclosure, the pennycress meal is added as a replacement for or in addition to the other protein/amino acid sources used in animal feed. Preferably, the pennycress meal comprises between 0.05% to 30%, and more preferably between 0.1% and 15% of ruminant feed composition and 0.1% and 10% of monogastric and poultry feed compositions. It has been found that the pennycress meal contains bypass protein (rumen undegradable protein), which allows more protein to be utilized by ruminants. A bypass protein of value is a protein that is undigested in the rumen and digested post-ruminally, and that has an amino acid profile that provides the limiting amino acids needed for the productive function of interest. The bypass protein in the low glucosinolate pennycress meal of this disclosure contains rumen un-degradable protein that is post-ruminally digested and has an amino acid composition that is high in limiting amino acids for growth.

The animal feed compositions of this disclosure are suitable for feeding a variety of livestock. Specific examples include beef cattle, dairy cattle, pigs, lambs, goats, and chickens. The compositions can be prepared by any conventional method used for preparing animal feeds, with the pennycress meal added in the step in which the protein component is added to the feed.

Preferred examples of mechanically-expeller pressed low glucosinolate field. pennycress meal useful as an animal feed composition can have the following nutritional values: total glucosinolates, less than 30 micromoles/g DW meal (typically between 19.4 and 24.0 micromoles/g DW); crude protein, greater than 28% DW meal (typically between 27.6% and 30.3% DW); crude fat, less than 15% DW (typically between 8.9 and 11.5% DW); crude fiber, less than 29% DW meal (typically between 27.6 and 30.3% DW); and total sulfur, 1.3% DW meal (typically between 0.62 and 1.15% DW).

Preferred examples of solvent extracted low glucosinolate field pennycress meal useful as an animal feed composition can have the following nutritional values: total glucosinolates, less than 30 micromoles/g DW meal (typically between 14.3 and 18.9 micromoles/g DW); crude protein, greater than 28% DW meal (typically between 34.6 and 35.4% DW); crude fat, less than 5% DW (typically between 1.0 and 4.0% DW); crude fiber, less than 29% DW meal (typically between 32.6 and 33.7% DW); and total sulfur, 1.3% DW meal (typically between 0.69 and 0.71% DW).

Protein, amino acid composition and energy are the main components affecting the economic value of pennycress meals. The protein content of mechanical expelled pennycress meal makes it desirable for feeding to cattle and in different amounts to pigs and poultry. Pennycress meal has a desirable Ala, Arg, Asp, Gly, Ile, Leu, Lys, Phe, Ser, Thr, Tyr and Val profile making it useful in animal feed compositions for pigs. Further, based on its amino acid profile, combining pennycress meal with distillers grains would provide an improved amino acid profile for feeding pigs. Based on the amino acid profile, pennycress meal could provide key sources of amino acids for ruminants when in the rumen undegraded protein fraction.

Amino acid requirements of ruminants are met by the combination of 1) rumen derived protein through the ingestion of rumen degradable protein and 2) rumen undegraded protein (RUP) that is digested post-rumen. The goal is to maximize the production of protein in the rumen and augment the supply with RUP of the appropriate amino acid profile that is digested in post-rumen. Pennycress meal contains a low level of RUP, a desirable level of rumen-digested protein, and a high level of undigested protein as a percent of crude. Processing such as temperature and time of meal exposure can have a big impact on the RUP value and the proportion that is digested post-rumen. RUP is of value to highly productive ruminants where requirements cannot be entirely met by microbially-produced protein in the rumen.

The energy content of feed ingredients is dependent on numerous constituents such as the protein, fat, fiber, lignin, ash, and carbohydrate content as well as the digestibility of those constituents.

For poultry, typical animal feed compositions can include carbohydrates, protein, fats and oils, vitamins and minerals, and additives and raw materials. Typical sources of carbohydrates include cereals, such as corn, wheat, sorghum, barley, rye and oats. The protein sources can be either animal or vegetable sources. Animal sources can include meat meal, meat and bone meal, fish meal, poultry by-product meal, blood meal, and feather meal. Vegetable sources include oil seeds such as soybean, canola, sunflower, palm kernel, copra, peanut, sesame, cottonseed, peas, and lupins. Protein sources from by-products can include distillers grains, and corn gluten meal. The protein typically makes up about 12 to 24% of the diet. The low glucosinolate field pennycress meal of this disclosure can be substituted for part of the protein component of the poultry feed composition. Typical minerals include calcium, phosphorus, magnesium, potassium, sulfur, sodium, copper, iron, manganese, zinc, selenium, cobalt, and iodine. Typical vitamins are A, D, E, K, B12, biotin, choline, folic acid, niacin, pyridoxine, thiamine, riboflavin, and pantothenic acid. The amounts included are the amounts typically found in poultry feed compositions. The poultry animal feed composition can be made using methods commonly used in the industry. The 30 micro-mole/g DW field pennycress level, at the 10% DW inclusion in animal feed compositions corresponds to 3 moles/g DW feed.

Similarly, for pigs, the animal feed compositions can include carbohydrates, protein, fats and oils, vitamins and minerals. Again, the compositions are made using methods common in the industry, and the low glucosinolate field pennycress meal can be used as a part of the protein component of the feed. Depending upon the type of pig, and the stage of its life, the protein level can vary, and typically ranges from 5 to 20% by weight of the feed composition.

Likewise, for cattle, the feed can contain carbohydrates, as well as forage products such as hay, alfalfa, grass, straw, silage, and oat straw, byproducts such as distillers grains with solubles, cottonseed hulls, soybean hulls, sugar beet pulp, brewers grains, canola meal, sunflower meal, and corn gluten meal, and, proteins, fats, and vitamins and minerals, and the low glucosinolate field pennycress meal can be used as part of the protein component of the feed. Typically, the protein component comprises between 10 and 22% by weight of the feed composition.

EXAMPLES

Example 1. Method for Identification of Low Glucosinolate Pennycress Lines

Samples were harvested into deep-well microtiter tubes (three biological replicates of 20 mg of dried seeds per line). To extract glucosinolates, 260 µL of 80% methanol was added into each tube and the seeds were allowed to soak for a few hours to overnight. Four 2.3-mm ball bearings were added, and the samples were ground for 6 min in a paint shaker by high-speed agitation. An additional 260 µL 80% methanol was added to the samples and were then allowed to incubate for 60 min at 180 rpm on a rotary shaker. The tissue debris and protein were pelleted by centrifuging at 2500 g for 10 min, and the supernatant was used for anion-exchange chromatography. Ninety-six-well filter plates from Millipore (preferably, model MAHVN4550 or MSHVN4550) were loaded with 45 µL of DEAE Sephadex A-25 by using the Millipore multiscreen column loader. 300 µL of water is added to hydrate the Sephadex and allowed to equilibrate for 2 to 4 hr. After water was removed with 2 to 4 sec of vacuum on the Pall vacuum manifold, the columns were rinsed with an additional 150 µL of water, removed by 2 to 4 seconds vacuum. 150 µL of the supernatant was added to the 96-well columns, and the liquid removed by 2 to 4 sec of vacuum. The columns were washed four times with 150 µL of 67% methanol and three times with 150 µL of water. After washing, the columns were centrifuged at 1200 g for 3 minutes to remove excess liquid. To desulfate glucosinolates on the column, 100 µL of water and 10 µL of sulfatase solution is added to each column, and the plates were incubated overnight at room temperature (adapted from Hogge et al., 1988). Desulfosinigrin is eluted either by centrifugation at 1200 g for 2 minutes, or by placing a deep-well 2-mL 96-well plate in the bottom of the 96-well vacuum manifold and aligning the 96-well column plate. The DEAE Sephadex is washed and further eluted with three rounds of 100 µL of water, eluted via centrifugation (1200 g, 2 min) or vacuum manifold. 40 µL elution aliquots (diluted with 160 µL of water to ensure accurate readings) were then measured on Greiner Bio-One UV-Star plates using a standard plate reader at 230 nm. Readings from control wells corresponding to the columns that have not received any plant extracts, but have received sulfatase, were averaged to produce an estimate for background absorbance coming from the desulfating enzyme a purified sulfatase enzyme from *Helix pomatia* type H-1 (S9626, Sigma-Aldrich, Saint Louis, Mo., USA). The sulfatase average is subtracted from plant sample readings and the adjusted number is compared to the readings coming from another set of control wells that contained only known amounts of commercially available pure sinigrin.

Using that known amount as a reference point, absolute numbers for sinigrin amounts in plant samples were generated and sinigrin content in µmoles/g seed weight is calculated. The method is fast, inexpensive and highly scalable allowing hundreds of samples to be processed by one qualified technician in a matter of less than three days.

Using this high throughput method, we were able to screen wild type field pennycress lines for sinigrin content and produce an accurate estimate for each line based on a minimum of three biological and two technical replicates.

Many lines were measured multiple times to increase confidence in sinigrin estimates. One of the lines, a USDA line called 'Beecher' was measured over 60 times and produced a normal distribution with a mean of ~100 µmoles/g and a standard deviation of the mean of ~14 µmoles/g, suggesting about 14% standard error in the estimates produced by our method. The results of the library screen are presented in FIG. 4 and selected low glucosinolate accessions are listed in Table 1.

Table 1. Sinigrin content in seeds from selected pennycress lines with low glucosinolates content measured using high throughput UV-absorbance-based method. A minimum of three biological replicates each consisting of 20 mg (~20 seeds) per replicate was used. Each biological replicate was split into two technical replicates that were loaded on the mini-column and treated independently after seed extraction process. Last column represents standard error of the mean for sinigrin content in each line.

| | Line ID | Biological Reps | Technical Reps | Sinigrin, Mean µmoles/g seed | Std Error, Mean µmoles/g seed |
|---|---|---|---|---|---|
| 1 | 1280 Macomb 2015 | 3 | 2 | 45 | 1.2 |
| 2 | 1258 Macomb 2015 | 3 | 2 | 46 | 5.2 |
| 3 | 1173 Win 2014 | 6 | 2 | 52 | 2.4 |
| 4 | 1052 Macomb 2015 | 9 | 2 | 52 | 1.3 |
| 5 | 1284 Macomb 2015 | 12 | 2 | 52 | 2.3 |
| 6 | 1068 Win 2014 | 12 | 2 | 53 | 2.3 |
| 7 | 2038 GFI 2016 | 3 | 2 | 54 | 3.5 |
| 8 | 1177 Macomb 2015 | 3 | 2 | 55 | 4.0 |
| 9 | 2072 GH 2016 | 3 | 2 | 55 | 8.1 |
| 10 | 2551 Field 2016 | 3 | 2 | 55 | 6.4 |
| 11 | 1038 Macomb 2015 | 3 | 2 | 56 | 7.5 |
| 12 | 1014 Macomb 2015 | 3 | 2 | 56 | 8.1 |
| 13 | 1135 Macomb 2015 | 3 | 2 | 56 | 6.4 |
| 14 | 1195 Macomb 2015 | 9 | 2 | 57 | 2.0 |

Example 2. Processing of Pennycress Seeds to Obtain Seed Meal with Lower Sinigrin Content Two processes for preparation of pennycress seed meal were performed as shown in FIG. 4A and FIG. 4B.

For the process of FIG. 4A, field pennycress seed having a sinigrin content of 66 micromoles per gram was cleaned on a shaker that had a 12-mesh production screen (Rotex shaker). The screened material was conditioned using a single deck of a French cooker for approximately 5 minutes at 100° F.+/−10° F. Conditioned seed was then processed using a Ferrel Ross flaking rolls to yield flakes with a thickness of approximately 0.012 inches or thinner. Flakes were then loaded into the French cooker with the objective of inactivating myrosinase. Moisture in the range of 6 to 8% was desirable because it aids in heat transfer, which is required for inactivation of lipases and myrosinase. The seed or flaked seed was not permitted to linger at warm temperatures that are not denaturing. The moisture content of this batch of seed was 9.95% as measured using a moisture meter. The flakes were brought to 190° F. as soon as possible. This was achieved in 10 to 15 minutes. The flake was dried to between 4 to 6% moisture content. When the moisture was low, the cooker exhaust was turned off. After removal of cooked material from the French cooker, a second cooker was used to help hold the temperature to at least 190° F. before going into the press (or in some cases to bring the material to 190° F.). Processing was done in batch mode. The cooked flakes were expelled using a mini Rosedowns press. The temperature of flakes going into the Rosedowns press was continually monitored with either a digital or analog thermometer. The temperature was generally 190° F.+/−10° F. The expelled flakes (i.e., seedcake) were passed through the extruder as shown in FIG. 4A, and the level of sinigrin is greatly reduced after passing through the extruder as compared to the level of sinigrin after the mechanical expeller step. To make collets or extrudate, an 4.5-inch Anderson Expander-Extruder-Cooker™ (Anderson International, Stow Ohio) was used.

In the process of FIG. 4B, some seed was flaked and sent directly to the extruder without cooking. To make collets or extrudate, an 4.5-inch Anderson Expander-Extruder-Cooker™ (Anderson International, Stow Ohio) was used as an extruder. As shown in FIG. 4B, the level of sinigrin is reduced after passing through the extruder. One of the samples of extrudate, which was made directly from flakes as shown in FIG. 4B, was dried (5.02% moisture level) via belt dryer, then heated to 190° F. in the small cooker. The extrudate sample was then processed using the expeller press. A sample of press cake (250 grams) was saved for sinigrin analysis and the remainder of the press cake was extracted using hexane as above. The sample was desolventized in the DT. Samples were analyzed for sinigrin using the method described in Example 1 and, independently, using standard HPLC-based method at the commercial analytical service (EAG Laboratories, St. Louis, Mo.).

Extruder processed press cake (FIG. 4A) or press cake (from the process of FIG. 4B) was extracted in stainless batch cans using commercial hexane at a temperature of 110-140° F.+/−10° F. Solvent was added and drained sequentially in 6 rounds of incubation, each of which was approximately 15 minutes. To remove residual hexane and yield desolventized meal, a batch-type desolventizer/toaster (DT) was heated, which showed a product temperature of 150-175° F. under vacuum. The press cake that was processed via extruder was too small for the DT, and was air-desolventized.

Results for the two processes described above are shown in FIGS. 4A and 4B, which indicates the reductions of sinigrin obtained by the extrusion step.

Example 3. Processing of Pennycress Seeds to Obtain Seed Meal with Lower Sinigrin Content Three processes for preparation of pennycress seed meal were performed: a process without the extruder step and two processes that included the extruder step as shown in FIG. 3C and FIG. 3D.

The same source of field pennycress seed as used in Example 2 was used in Example 3. Pennycress seed having a sinigrin content of 66 micromoles per gram was cleaned on a shaker that had a 12-mesh production screen (Rotex shaker). The screened material was conditioned using a single deck of a French cooker for approximately 5 minutes at 100° F.+/−10° F. Conditioned seed was then processed using a Ferrel Ross flaking rolls to yield flakes with a thickness of approximately 0.012 inches or thinner. Flakes were separated into two lots. The first lot of flakes were then loaded into the French cooker with the objective of inactivating myrosinase. Moisture in the range of 6 to 8% was desirable because it aids in heat transfer, which is required for inactivation of lipases and myrosinase. The seed or flaked seed was not permitted to linger at warm temperatures that are not denaturing. The moisture content of this batch of seed was 9.95% as measured using a moisture meter. The flakes were brought to 190° F. as soon as possible. This was achieved in 10 to 15 minutes. The flake was dried to between 4 to 6% moisture content. When the moisture was low, the cooker exhaust was turned off. After removal of cooked material from the French cooker, a second cooker was used to help hold the temperature to at least 190° F. before going into the press (or in some cases to bring the material to 190° F.). Processing was done in batch mode.

The second lot of flakes was sent directly to the extruder without cooking (FIG. 3D). To make collets or extrudate, an 4.5-inch Anderson Expander-Extruder-Cooker™ (Anderson International, Stow Ohio) was used as an extruder. The extruder/expander was operated with a shaft speed of approximately 203 rounds per minute (RPM), minimal steam (⅛ turn on valve). The die opening was 5/16th-inch with a ¼-inch land. The equipment feed rate was about 3 pounds per minute. The extrudate was then processed using the expeller press.

The cooked flakes and extrudate were expelled using a Rosedowns mini 200 press. The press was fed from a Wenger metered feeder with flake at a rate of 3.5 to 4 pounds per minute with flake, and extrudate was not calibrated, but fed at the same RPM. The press operated best at 50 to 55 Hz, which corresponds to 38 to 40 RPM. The temperature of flakes and extrudate going into the Rosedowns press was continually monitored with either a digital or analog thermometer. The temperature was generally 190° F.+/−10° F. The flakes and extrudate were preheated to 190° F.+/−10° F. before feeding into the press.

A sample of press cake from the pressed extrudate was saved for sinigrin analysis and the remainder of the press cake extracted using hexane.

The press cake from the expelled flaked pennycress was divided into two lots. The first lot was extracted with hexane. The second lot was broken down using a hammer mill (screen size not recorded, 0.25 inch perforations usually used in this situation) to facilitate feeding into the extruder. The moisture content of the material was 4.13%. Water was added to make up for the lower moisture. Conditions for running the extruder was the same as for the flake. Extrudate was extracted using hexane.

Regular press cake, extruder processed press cake (FIG. 3D) or extruded then pressed cake (FIG. 3C) were extracted in stainless batch cans using commercial hexane at a temperature of 110-140° F.+/−10° F. Solvent was added and drained sequentially in 5 rounds of incubation, each of which was approximately 12 minutes. To remove residual hexane and yield desolventized meal, a batch-type desolventizer/toaster (DT) was heated, which showed a product temperature of 150-175° F. under vacuum. Samples of the three solvent extracted meals were collected for sinigrin analysis.

Samples were analyzed for sinigrin using the method described in Example 1 and, independently, using standard HPLC-based method at the commercial analytical service (EAG Laboratories, St. Louis, Mo.).

Sinigrin concentration in solvent extracted pennycress meal with no extrusion step, extrusion step prior to mechanical expeller pressing, and extrusion after the mechanical expeller pressing was 97.6 micromoles/g, 66.0 micromoles/g and 38.5 micromoles/g, respectively. The inclusion of an extrusion step after mechanical expelling thus resulted in about a 60% reduction in sinigrin as compared to the solvent extracted pennycress with no extrusion step.

CITED REFERENCES

Kumar, Arvind, et al., eds. *Brassica oilseeds: Breeding and management*. CABI, 2015.

Kumar R R, Rao P H, Arumugam M. Lipid extraction methods from microalgae: a comprehensive review. Front Energy Res. 2015

Biston, R., et al. "Fast analysis of rapeseed glucosinolates by near infrared reflectance spectroscopy." *Journal of the American Oil Chemists' Society* 65.10 (1988): 1599.

Tholen, J. T., et al. "Measurement of the glucosinolate content in rapeseed using the trubluglu meter." *Plant breeding* 110.2 (1993): 137-143.

Hassan, Ferah, et al. "Enzyme-linked immunosorbent assays for alkenyl glucosinolates." *Journal of agricultural and food chemistry* 36.2 (1988): 398-403.

Lichter, R., et al. "Glucosinolates determined by HPLC in the seeds of microspore-derived homozygous lines of rapeseed (*Brassica napus* L.)." *Plant Breeding* 100.3 (1988): 209-221.

Kliebenstein, Daniel J., et al. "Gene duplication in the diversification of secondary metabolism: tandem 2-oxoglutarate-dependent dioxygenases control glucosinolate biosynthesis in *Arabidopsis*." *The Plant Cell* 13.3 (2001): 681-693.

Hogge, L. R., et al. "HPLC separation of glucosinolates from leaves and seeds of *Arabidopsis thaliana* and their identification using thermospray liquid chromatography/mass spectrometry." *Journal of Chromatographic Science* 26.11 (1988): 551-556.

What is claimed is:

1. A method of making a low glucosinolate field pennycress seed meal comprising:
   (a) obtaining (i) flaked pennycress seed, (ii) flaked and cooked pennycress seed, or (iii) pennycress seed cake from field pennycress seed having less than about 50 micromoles per gram by dry weight of sinigrin;
   (b) expanding or extruding for less than 10 minutes under high temperature and pressure a composition comprising water and (i) the flaked pennycress seed, (ii) the flaked and cooked pennycress seed, or (iii) the pennycress seed cake to obtain an expandate or extrudate; wherein:
      the expanding is performed in an expander at a temperature of about 90 to 150 degrees centigrade, a final pressure before the expander outlet of about 20 to about 100 bars, and/or a retention time of the composition in the expander of about 1 to 10, 20, 40, or 60 seconds; and the percentage of water in the composition is about 10% to 80% by weight; or
      the extruding is performed in an extruder at a temperature of about 80 to about 200 degrees centigrade, a final pressure before the extruder outlet of about 25 to about 100 bar, and/or a retention time of the composition in the extruder of about 10, 20, or 40 to about 60, 120, or 150 seconds; and the percentage of water in the composition is about 10% to about 80% by weight; and
   (c) processing the expandate or extrudate to obtain a meal, thereby obtaining a low glucosinolate field pennycress seed meal comprising less than 30 micromoles per gram by dry weight of sinigrin.

2. The method of claim 1, wherein the method further comprises flaking field pennycress seeds having less than about 50 micromoles per gram by dry weight of sinigrin to obtain the flaked pennycress seed in step (a)(i) or (a)(ii).

3. The method of claim 1, wherein the method further comprises cooking the flaked pennycress seed to obtain the flaked and cooked pennycress seed in step (a)(ii) or cooking and pressing the pennycress seed to obtain the pennycress seed cake in step (a)(iii).

4. The method of claim 1, wherein expanding is performed in an expander or an extruder at a temperature of about 90 to 150 degrees centigrade, a final pressure before the expander outlet of about 20 to about 100 bars, and a retention time of the composition in the expander of about 1 to 10, 20, 40, or 60 seconds; and wherein the percentage of water in the composition is about 10% to 80% by weight.

5. The method of claim 1, wherein extruding is performed in an extruder at a temperature of about 80 to about 200 degrees centigrade, a final pressure before the extruder outlet of about 25 to about 100 bar, and a retention time of the composition in the extruder of about 10, 20, or 40 to about 60, 120, or 150 seconds; and wherein the percentage of water in the composition is about 10% to about 80% by weight.

6. The method of claim 1, wherein the expandate or extrudate obtained in step (b) from the flaked penny cress seed of step (a)(i) or the flaked and cooked pennycress seed of step (a)(ii) is processed in step (c) by at least one of the following steps comprising: (i) macerating or grinding the expandate or extrudate; (ii) expelling the expandate or extrudate to obtain pressed cake; and/or (iii) extracting the pressed cake with solvent.

7. The method of claim 1, wherein the expandate or extrudate obtained in step (b) from the pennycress seed cake of step (a)(iii) is processed in step (c) by at least one of the following steps comprising: (i) macerating and/or grinding the expandate or extrudate; and/or (ii) extracting the expandate or extrudate and/or macerated and/or ground expandate or extrudate with solvent.

8. The method of claim 1, wherein the low glucosinolate field pennycress seed meal that is obtained in step (c) comprises 5 or 10 to 29.8 micromoles per gram by dry weight of sinigrin.

* * * * *